Figure 1:
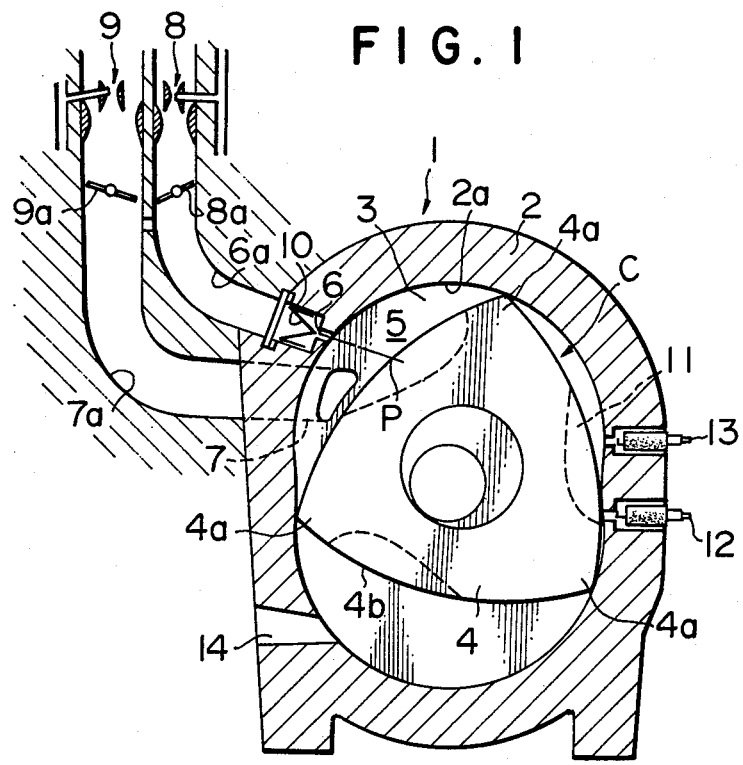

United States Patent [19]

Shimoji et al.

[11] 4,103,666
[45] Aug. 1, 1978

[54] FUEL SUPPLY MEANS FOR ROTARY PISTON ENGINES

[75] Inventors: Masaharu Shimoji; Yasuo Tatsutomi, both of Hiroshima; Yutaka Hirose, Aki; Atsumichi Yamasaki; Katsuaki Kikura, both of Hiroshima, all of Japan

[73] Assignee: Toyo Kogyo Co., Ltd., Japan

[21] Appl. No.: 690,319

[22] Filed: May 26, 1976

[30] Foreign Application Priority Data

May 26, 1975 [JP] Japan ................... 50-63178

[51] Int. Cl.² ............................................ F02B 53/04
[52] U.S. Cl. ................................................ 123/219
[58] Field of Search ............... 123/8.09, 8.13, 32 SP

[56] References Cited

U.S. PATENT DOCUMENTS

| 3,890,942 | 6/1975 | Date et al. | 123/32 SP X |
| 3,915,126 | 10/1975 | Kishimoto et al. | 123/8.13 |
| 3,964,446 | 6/1976 | Kono et al. | 123/8.13 |
| 3,977,368 | 8/1976 | Yamaguchi et al. | 123/8.13 |
| 4,003,346 | 1/1977 | Kohno | 123/8.13 |
| 4,023,535 | 5/1977 | Ishikawa | 123/8.13 |

FOREIGN PATENT DOCUMENTS

| 2,363,863 | 8/1974 | Fed. Rep. of Germany | 123/8.13 |
| 2,411,698 | 9/1975 | Fed. Rep. of Germany | 123/8.13 |

Primary Examiner—Carlton R. Croyle
Assistant Examiner—Michael Koczo, Jr.
Attorney, Agent, or Firm—Fleit & Jacobson

[57] ABSTRACT

Rotary piston engine having a first intake port formed in rotor housing and one or more second intake ports formed either one or both of the rotor and side housings. The first intake port supplies relatively rich air-fuel mixture having mixing ratio of 2 to 6 and the second intake port supplies air or relatively lean mixture in such a manner that the total air-fuel ratio becomes 15 to 20.

9 Claims, 4 Drawing Figures

FUEL SUPPLY MEANS FOR ROTARY PISTON ENGINES

The present invention relates to rotary piston type internal combustion engines and more particularly to intake means for rotary piston engines.

Conventional rotary piston engines include a casing which comprises a rotor housing having an inner wall of trochoidal configuration and a pair of side housings secured to the opposite sides of the rotor housing to define therein a rotor cavity of trochoidal configuration, and a rotor of substantially polygonal configuration disposed in said rotor cavity of the casing for revolution and rotation with apex portions in sliding contact with the inner wall of the rotor housing so as to define working chambers of variable volume between flank portions thereof and the trochoidal inner wall of the rotor housing. The casing is provided with intake port means opening to one of the working chambers which is in intake stroke and also with exhaust port means opening to other one of the working chambers which is in exhaust stroke. There are two types of intake port means, one being a peripheral intake port formed in the rotor housing and the other being side intake ports formed in one or both of the side housings.

Hithertofore, it has been proposed to provide a first intake port in the rotor housing for supplying relatively rich air-fuel mixture to the intake working chamber and a second intake port in the rotor or side housing for supplying air or relatively lean air-fuel mixture. For example, Japanese patent application No. 47-68177 which has been disclosed on Mar. 12, 1974 under the public disclosure No. 49-27708 discloses in FIGS. 1 and 2 a rotary piston engine having first and second intake ports formed in the rotor housing.

This type of intake port arrangement is considered as being advantageous in that the first intake port can be oriented in the direction of rotor rotation so that the flow resistance can be minimized and the rich air-fuel mixture can be effectively directed to the leading side, that is, the side in the direction of rotor rotation, of the intake working chamber. By directing the rich mixture to the leading side of the intake working chamber, it becomes possible to increase the total air-fuel ratio without sacrificing the ignition and combustion properties of the mixture.

However, in rotary piston engines, since the working chambers are displaced along the trochoidal inner wall surface of the rotor housing, there is a tendency that the air-fuel mixture is spread as soon as it is supplied to the working chamber. Further, due to the effect of inertia, fuel particles are apt to be concentrated in the trailing side, that is, the side opposite to the direction of rotor rotation, of the intake working chamber. Thus, it is very difficult to establish effective stratified fuel distribution in the working chamber.

It should further be noted that the air-fuel ratio of the rich mixture supplied through the first intake port must be carefully determined taking into consideration the amount of air or the amount and air-fuel ratio of the lean mixture supplied through the second intake port, as well as the specific intake port designs. Thus, it will be understood that a simple increase in the total air-fuel ratio will often cause misfire particularly under light load engine operation, and pollutant emissions in exhaust gas will therefore be increased.

The present invention has therefore an object to provide intake means for rotary piston engines, which can meet the recent severe requirements on fuel economy and pollutant emissions in the engine exhaust gas.

Another object of the present invention is to provide rotary piston engines having intake port means which can increase the total air-fuel ratio of mixture without accompanying the possibility of misfire during engine operation.

According to the present invention, in order to accomplish the above and other objects, the rotary piston engine includes first intake port means formed in the rotor housing, means associated with the first intake port means for supplying therethrough air-fuel mixture having air-fuel ratio of 2 to 6 at least under light load and medium load conditions, second intake port means formed in the casing and having a cross-sectional area which is larger than that of the first intake port means, and means associated with the second intake port means for supplying therethrough combustion sustaining fluid in such a manner that the total air-fuel ratio becomes 15 to 20 at least under the light load and medium load conditions.

Figure 3:
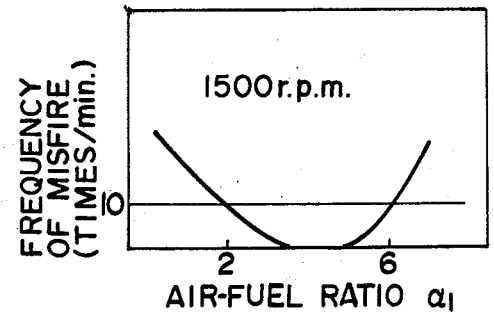
Figure 4:
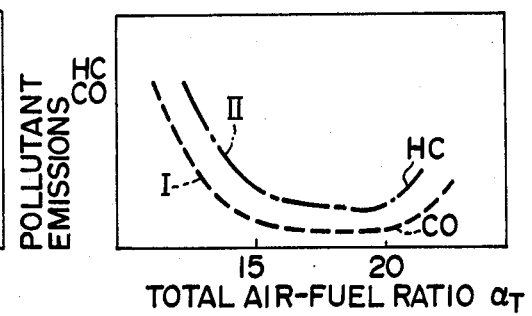
Figure 2:
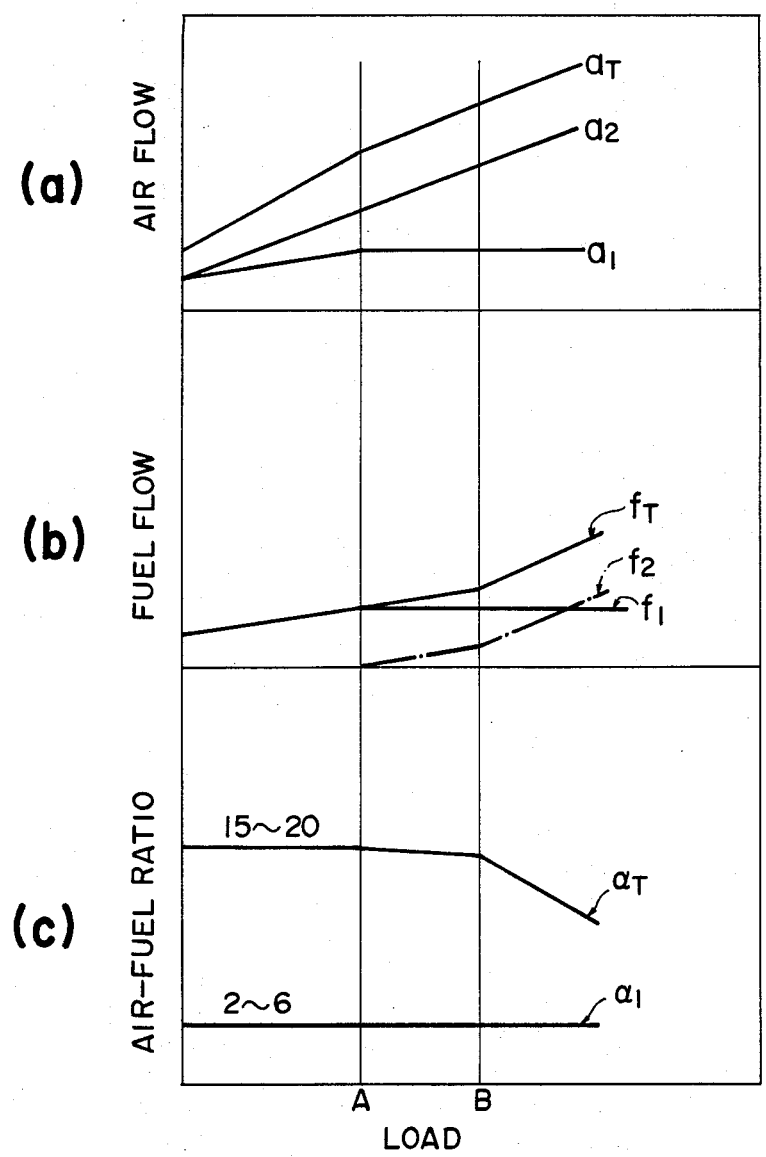

The above and other objects and features of the present invention will become apparent from the following descriptions of a preferred embodiment taking reference to the accompanying drawings, in which:

FIG. 1 is a sectional view of a rotary piston engine in accordance with one embodiment of the present invention;

FIGS. 2(a) through (c) show in diagrams the relationship among the intake air flow, the fuel flow and the air-fuel ratio;

FIG. 3 is a diagram showing the influence of air-fuel ratio of the rich mixture on the probability of misfire; and FIG. 4 is a diagram showing the influence of the total air-fuel ratio on the amount of unburnt constituents in the engine exhaust gas.

Referring now to the drawings, particularly to FIG. 1, there is shown a rotary piston engine comprising a casing 1 which includes a rotor housing 2 having an inner wall 2a of trochoidal configuration and a pair of side housings 3 secured to the opposite sides of the rotor housing 2. Thus, a rotor cavity C of trochoidal configuration is defined in the casing 1. In the cavity C, there is disposed a substantially triangular rotor 4 for revolution and rotation with its apex portions 4a in sliding contact with the trochoidal inner wall 2a of the rotor housing 2, so as to define working chambers 5 of variable volume between flanks 4b of the rotor 4 and the inner wall 2a of the rotor housing 2. Each of the working chambers 5 conducts cyclic volumetric change as the rotor 4 rotates so that intake, compression, combustion, expansion and exhaust strokes are sequentially performed.

The casing 1 has a first intake port 6 provided in the rotor housing 2 to open to the cavity C at one of the working chambers 5 which is in the intake stroke. A second intake port 7 is provided in one of the side housings 3. It should be noted that the second intake port 7 may be provided in the rotor housing 2. Alternatively, a plurality of second intake ports may be provided in both of the side housings 3 or in the rotor and side housings.

The first intake port 6 communicates with a first intake passage 6a which is provided with a first carburetor 8 for providing a rich air-fuel mixture to be supplied to the first intake port 6. The carburetor 8 has a throttle valve 8a as is conventional in the art. The first intake passage 6a is further provided with a reed type check valve 10 which allows flow of mixture into the working chamber 5 but blocks reverse flow.

The second intake port 7 is in communication with a second intake passage 7a which is provided with a second carburetor 9 having a second throttle valve 9a.

As well known in the art, the casing 1 is provided with a pair of ignition plugs 12 and 13, and an exhaust port 14. Each of the rotor flanks 4b is formed with a recess 11 at leading part thereof for providing an appropriate combustion space.

It is preferred that the first intake port 6 has an effective cross-sectional area which is small in relation to that of the second intake port 7 so that a relatively small amount of rich mixture is supplied therethrough at a relatively high speed. Further, it is also preferable to locate the first intake port 6 in the vicinity of the preceding apex portion at the top dead center of the rotor in which the related intake working chamber possesses minimum volume. Alternatively, the first intake port 6 may be located in the leading side of the preceding apex portion at the top dead center. It is further preferable to locate the first intake port 6 in the axially central portion of the casing 1.

Preferably, the first intake port 6 is so directed that the extension of its axis intersects the flank 4b of the rotor 4 at a point P which is in the leading part of the rotor flank with respect to the center thereof when the rotor 4 is in the position where the rate of volume change of the working chamber 5 is the largest. Such rotor position may be represented as 135° after intake top dead center in terms of the angle of the eccentric shaft. Most recommendably, the first intake port 6 is so directed that the extension of its axis intersects the rotor flank 4b at a point P which will be confronted with the leading ignition plug 12 when the flank 4b is brought into the compression dead center position so that the ignition spark is directed to the part where the rich mixture is most concentrated.

In operation, the throttle valve 8a in the first carburetor 8 is gradually opened from the idling position to a light load position A. Under a load condition beyond the light load position A, the opening of the throttle valve 8a is maintained substantially constant so as to provide a supply of air as schematically shown by a line $a_1$ in FIG. 2(a). The carburetor 8 supplies fuel in proportion to the air flow as shown by a line $f_1$ in FIG. 2(b), whereby an air-fuel mixture of substantially constant mixing ratio can be supplied through the first intake port 6 throughout the engine operating range as shown by a line $a_1$ in FIG. 2(c). According to the present invention, the first carburetor 8 is intended to control the amount of fuel supply in accordance with the air passing through the first intake passage 6a so that the air-fuel ratio of the mixture supplied through the first intake port 6 is between 2 and 6.

The second throttle valve 9a of the second carburetor 9 is gradually opened from the idling position to the full open position to allow flow of air to pass therethrough as shown by a line $a_2$ in FIG. 2(a). Thus, the engine is totally supplied with air, the amount of which changes as shown by a line $a_T$ in FIG. 2(a).

The second carburetor 9 is as designed that it does not provide any supply of fuel between idling position and the light load position A. Between the light load and medium load positions A and B, the carburetor 9 supplies fuel, the amount of which is relatively slowly increased in response to an increase in the engine load. Under a load condition beyond the medium load position B, the supply of fuel from the second carburetor 9 is increased in response to an increase in the engine load at a relatively high rate as shown by a line $f_2$ in FIG. 2(b). Thus, the total supply of fuel changes in response to the engine load as shown by a line $f_T$ in FIG. 2(b).

Thus, the total air-fuel ratio of the mixture supplied to the engine is changed substantially as shown by a line $a_T$ in FIG. 2(c). In more detail, under load conditions below the medium load B, the total air-fuel ratio is maintained at a substantially constant value which is between 15 and 20. Under load conditions beyond the medium load B, the total air-fuel ratio $a_T$ is decreased to meet the demand under heavy load operation.

According to the present invention, the first carburetor 8 is so designed that an air-fuel mixture of mixing ratio of 2 to 6 is supplied through the first intake port 6 as previously described. This design has been found effective to eliminate or remarkably decrease misfire in light load engine operation.

Referring specifically to FIG. 3, there is shown an influence of the air-fuel ratio $a_1$ on the possibility of misfire under a light load operation with engine speed of 1500 rpm. In FIG. 3, it will be noted that the possibility of misfire can be decreased by properly determining the air-fuel ratio $a_1$ of the mixture supplied through the first intake port 6. The recommendable air-fuel ratio $a_1$ of 2 to 6 has been determined by taking the allowable limit of the frequency of misfire as 10 times per minute.

It should of course be noted that the ratio of effective area of the first intake port 6 to that of the second intake port 7 has influences on the possibility of misfire, however, with the area ratio of less than one-third, the above range of air-fuel ratio provides a satisfactory result. Further, it has also been found that, with the area ratio of less than one-third, more recommendably, less than one-fifth, the flow speed of rich mixture can be adequately increased, with the result that the rich mixture can be effectively directed to the leading part of the in-take working chamber to establish a stratified fuel distribution.

As well known in the art, an excessively rich air-fuel mixture is a cause of ignition failure. An air-fuel ratio of 2 to 6 is generally considered as being excessively rich and may cause misfire. However, according to the present invention, the rich mixture supplied through the first intake port is in part spread through circulation in the working chamber and in part diluted by air or lean mixture supplied through the second intake port 7, so that there will be formed a readily ignitable atmosphere having air-fuel ratio of 12 to 13 around the ignition plug 13 when the working chamber 5 is displaced to the positions of the ignition plugs.

When the mixture supplied through the first intake port 6 is richer than the aforementioned value, an excessively rich atmosphere will be formed around the ignition plugs. Further, when the mixture supplied through the first intake port 6 is leaner than the aforementioned value, the air-fuel mixture which will be formed around the ignition plugs will become excessively lean, so that possibility of misfire will correspondingly be increased.

The total air-fuel ratio $a_T$ may be determined in accordance with the air-fuel ratio $a_1$ of the rich mixture which is supplied through the first intake port 6. Referring now to FIG. 4, it will be noted that the amounts of CO and HC in the engine exhaust gas show the lowest values with the total air-fuel ratio of 15 to 20 as shown by lines I and II. With the total air-fuel ratio richer than 15, there will be an increase in the unburnt constituents due to the existence of excessive fuel components. With the total air-fuel ratio leaner than 20, the unburnt constituents in the exhaust gas will also be increased due to a delay in flame propagation and possible misfire. Thus, it is important in accordance with the present invention to determine the supply of air and fuel through the second intake port 7 so that the total air-fuel ratio becomes 15 to 20.

Thus, according to the features of the present invention, the first carburetor 8 provides a relatively rich air-fuel mixture having mixing ratio of 2 to 6 and the rich mixture is supplied through the first intake port 6 into the leading part of the intake working chamber 5 at a high flow speed so as to be distributed in and around the recess 11 in the associated flank 4b of the rotor 4. The air or lean mixture supplied through the second intake port 7 is mainly distributed in the trailing part of the intake working chamber 5 and partially encircles the rich mixture. The air or lean mixture serves to dilute the rich mixture to a certain degree and provides a total air-fuel ratio of 15 to 20. Further, as previously described, there is formed a readily ignitable air-fuel mixture having an air-fuel ratio of 12 to 13 around the leading ignition plug 12 when the mixture is ignited.

As previously described, the second intake port 7 may be formed in the rotor housing 2, however, in order to avoid problems caused by overlap in which the intake port bridges the intake and exhaust working chambers, it is preferable to provide the second intake port 7 in the side housing. It is of course within the scope of the present invention to provide a second intake port 7 in one of the side housings 3 and an additional intake port in the other of the side housings for providing mixture supply in heavy load engine operation.

In the illustrated embodiment the intake passages provided with carburetors, however, these carburetors may be substituted by fuel injection devices without departing from the scope of the invention. It should further be noted that, in the illustrated embodiment, a rich mixture of substantially constant air-fuel ratio is supplied through the first intake passage throughout the engine operating range, however, it is within the scope of the present invention to supply mixture having air-fuel ratio leaner than 6 or terminate the supply of rich mixture under high load engine operation because there is least possibility of misfire under such load condition.

The invention has thus been shown and described with reference to a specific embodiment, however, it should be noted that the invention is in no way limited to the details of the illustrated arrangements but changes and modifications may be made without departing from the scope of the appended claims.

We claim:

1. Rotary piston engine comprising a casing which includes a rotor housing having an inner wall of trochoidal configuration and a pair of side housings secured to the opposite sides of the rotor housing to define therein a rotor cavity of trochoidal configuration, and a rotor of substantially polygonal configuration disposed in said rotor cavity of the casing for revolution and rotation with apex portions in sliding contact with the inner wall of the rotor housing so as to define working chambers of variable volume between flank portions thereof and the trochoidal inner wall of the rotor housing, each of the flank portions of the rotor being formed with a recess at a leading part thereof, first intake port means formed in said rotor housing and located at such a position that it is closer to the preceding rotor apex portion than to any of the other rotor apex portions when the rotor is in the intake top dead center, means for supplying rich air-fuel mixture having an air-fuel ratio of 2 to 6 through the first intake port means into the intake working chamber, second intake port means formed in at least one of the side housings, said first intake port means having an effective area which is less than one-third that of the said second intake port means, means for supplying combustion sustaining fluid through the second intake port means into the intake working chamber in such a manner that the total air-fuel ratio of the mixture supplied to the intake working chamber becomes 15 to 20.

2. Rotary piston engine in accordance with claim 1 in which said first intake port means is provided with reed valve means which allows mixture flow only into the intake working chamber.

3. Rotary piston engine in accordance with claim 1 in which said first intake port means has an axis to inclined toward the direction of rotation of the rotor so that the mixture is supplied through the first intake port means toward the leading side of the intake working chamber.

4. Rotary piston engine in accordance with claim 1 in which said first intake port means is located at a position offset in the direction of rotor rotation from the position of the preceding rotor apex portion in the intake top dead center.

5. Rotary piston engine in accordance with claim 1 in which said first intake port means is so directed that an extension of its axis intersects the rotor flank at a point in the leading part thereof when the flank is in a position wherein the rate of volume change of the associated working chamber is largest.

6. Rotary piston engine in accordance with claim 1 in which said first intake port means is located in axially central portion of the casing.

7. Rotary piston engine in accordance with claim 1 in which means is provided for supplying additional amount of fuel through the second intake port means when the engine load is greater than a second predetermined value that defines heavy load operation to provide an additional engine output.

8. Rotary piston engine in accordance with claim 1 in which said first intake port means has an effective area which is less than one-fifth that of said second intake port means.

9. Rotary piston engine in accordance with claim 1 in which said means for supplying rich air-fuel mixture is operative at least when the engine load is below a first determined value that defines light load and medium load conditions.

* * * * *